(12) United States Patent
Staring et al.

(10) Patent No.: US 10,791,204 B2
(45) Date of Patent: **\*Sep. 29, 2020**

(54) METHOD AND DEVICE FOR PROCESSING DATA PACKETS

(71) Applicant: KONINKLIJKE PHILIPS N.V., Eindhoven (NL)

(72) Inventors: Antonius Adriaan Maria Staring, Eindhoven (NL); Andries van Wageningen, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,007

(22) Filed: Apr. 5, 2018

(65) Prior Publication Data

US 2018/0227398 A1    Aug. 9, 2018

Related U.S. Application Data

(63) Continuation of application No. 13/379,437, filed as application No. PCT/IB2010/052580 on Jun. 10, 2010.

(30) Foreign Application Priority Data

Jun. 25, 2009    (EP) .................................... 09163713

(51) Int. Cl.
H04L 29/06    (2006.01)
(52) U.S. Cl.
CPC .............. *H04L 69/26* (2013.01); *H04L 69/22* (2013.01)

(58) Field of Classification Search
CPC ........ H04L 69/166; H04L 69/22; H04L 69/26
See application file for complete search history.

(56) References Cited

U.S. PATENT DOCUMENTS

| 5,293,379 | A | 3/1994 | Carr |
| 6,404,804 | B1 | 6/2002 | Mannering |
| 7,058,524 | B2 | 6/2006 | Hayes |
| 7,295,526 | B2 | 11/2007 | Guanter |
| 7,375,493 | B2 | 5/2008 | Calhoon |
| 2002/0080771 | A1* | 6/2002 | Krumel .................. H04L 29/06 370/352 |
| 2002/0142797 | A1 | 10/2002 | Tarighi |
| 2003/0018793 | A1 | 1/2003 | Mora |

(Continued)

FOREIGN PATENT DOCUMENTS

| CN | 101094162 A | 12/2007 |
| CN | 101719918 A | 6/2010 |

(Continued)

OTHER PUBLICATIONS

"Anti-practical scientific network course", Linux Magazine, Oct. 2003.

*Primary Examiner* — Romani Ohri

(57) ABSTRACT

A method of encoding data packet by encoding type information and size information of the data packet into the same field. The data packet comprises a header part and a message part. The header part comprises at least one bit for indicating the type of the data packet, where the method includes obtaining the size information of the data packet based on the at least one bit.

22 Claims, 2 Drawing Sheets

(56) References Cited

U.S. PATENT DOCUMENTS

| | | | |
|---|---|---|---|
| 2004/0081140 A1* | 4/2004 | Martin | G01S 5/0252 370/352 |
| 2004/0223496 A1 | 11/2004 | Brueckheimer | |
| 2005/0127868 A1* | 6/2005 | Calhoon | G06F 1/26 320/108 |
| 2005/0243757 A1 | 11/2005 | Yagyu | |
| 2007/0195767 A1* | 8/2007 | Yonemoto | H04L 45/00 370/389 |
| 2007/0214502 A1 | 9/2007 | McAlister | |
| 2007/0271391 A1* | 11/2007 | Fujii | H04L 47/10 709/240 |
| 2008/0031253 A1 | 2/2008 | Kim | |
| 2008/0144490 A1 | 6/2008 | Jiang | |
| 2008/0181247 A1* | 7/2008 | Kim | H04L 49/90 370/412 |
| 2008/0253341 A1* | 10/2008 | Cordeiro | H04W 16/14 370/338 |
| 2008/0285476 A1* | 11/2008 | Rajakarunanayake | H04L 1/0045 370/252 |
| 2008/0291875 A1* | 11/2008 | Kang | H04W 36/0061 370/331 |
| 2009/0003317 A1* | 1/2009 | Kasralikar | H04L 63/1408 370/352 |
| 2009/0028331 A1* | 1/2009 | Millar | H04N 7/17318 380/255 |
| 2009/0086710 A1 | 4/2009 | Ho | |
| 2009/0147803 A1* | 6/2009 | Takayama | G06K 7/0008 370/475 |

FOREIGN PATENT DOCUMENTS

| | | |
|---|---|---|
| JP | 2000115281 A | 4/2000 |
| JP | 2001195327 A | 7/2001 |
| JP | 2002325099 A | 11/2002 |
| JP | 2007046292 A | 2/2007 |
| KR | 20060110074 A | 10/2006 |
| WO | WO9727691 A1 | 7/1997 |
| WO | WO9818286 A1 | 4/1998 |
| WO | WO0020876 A1 | 4/2000 |
| WO | WO2007097038 A1 | 8/2007 |

* cited by examiner

METHOD AND DEVICE FOR PROCESSING DATA PACKETS

The present invention relates to the communication of two devices, more particularly, to processing data packets transmitted from a second device to a first device.

The transmission of information from one device to another device occurs in all sorts of technical fields; for example, information is transmitted via data packets from one mobile phone to another, or from a server to a client, etc. Data packets can be transmitted via wire, for example, telephone line, network line, etc. Data packets can also be transmitted wirelessly, for example, using near field communication (NFC) technology, or using satellite communication technology, etc.

A data packet typically comprises a header part and a message part. The header part is used for indicating some basic information related to the data packet, such as: type of the data packet, size information (i.e. length) of the data packet, etc., which could also be understood as "metadata" or "overhead". The message part is used for carrying the message (i.e. information) that the data packet intends to carry.

In some cases, different types of data packet may have a different size of the message part. If the data packet needs to carry the size information of the data packet, typically, the header part is used to carry this size information. The header part for example has two sections, one for indicating the type of the data packet, and another one for indicating size information of the data packet. As an example, the header part has two bytes, the first byte being for indicating type information, and the second byte for indicating the size of the data packet.

However, in some other cases, since the data packet is required to be as small as possible, the header part has a very limited number of bits and it has to be used for indicating the type of the data packet; and there are no additional bits for indicating the size of the data packet.

For example, in a wireless power transmission system, a transmitter is used for transmitting power to a receiver inductively using at least one primary coil (transmission coil) and at least one secondary coil (receiving coil), and the receiver for example needs to send data packets carrying configuration information to the transmitter, so that the transmitter knows the power requirement of the receiver and knows how to configure the relevant parameters of the transmitter before the transmitter can start to transmit power to the receiver.

One approach to transmit these configuration data packets is the so-called load modulation, i.e. the transmitter applies (transmits) power to the receiver and the receiver varies its power consumption in order to encode binary signals i.e. data packets. In such a data transmission approach, the duration required to transmit a data packet increases by about 5.5 ms for each additional byte. Therefore, it is desirable to keep the overhead on a data packet as small as possible. As a consequence, the header part of this configuration data packet is defined so as to comprise only a single byte. This byte is used for indicating the type of data packet. There is no extra byte for indicating the size of the data packet.

From a first aspect of this invention, it is advantageous to propose a data packet carrying size information of said data packet. The data packet comprises a header part and a message part, said header part comprising at least one bit for indicating the type of said data packet, wherein said at least one bit is also associated with size information of said data packet.

From a second aspect of this invention, a method of encoding a data packet having at least one bit for representing both type information and size information of said packet is proposed; an encoder for encoding such a data packet is also proposed; and a device comprising the encoder is proposed. The device encodes the data packet and sends it to another device for communication with said other device.

From a third aspect of this invention, a method of processing data packets received from a second device by a first device is proposed. The data packet comprises a header part and a message part. The header part comprises at least one bit for indicating the type of said data packet. The method comprises a step of obtaining size information of said data packet, based on said at least one bit which is used for indicating the type of the data packet.

It is very useful to have the size information of a data packet. For example, if a transmitter does not know the size of the data packet, the transmitter does not know whether the data packet is complete or not, and cannot locate the different parts of the data packet. Only when the size information of the data packet is obtained, many different actions can be implemented by the first device.

In the context of this invention, since sometimes the parts other than the message part of a data packet are fixed parts defined by a protocol like a standard, the size of the data packet depends on the size of the message part of the data packet. In other words, as long as the size of the message part is known, the size of the data packet can be known and vice versa.

According to an embodiment of the invention, the method may further comprise a step of identifying said message part from said data packet according to the obtained size information.

According to an embodiment of the invention, said data packet further comprises a checksum part indicating a first value for verifying the correctness of the data packet. The checksum part can be located according to the obtained size information. The method further comprises a step of calculating a second value, using the identified message part; and a step of determining whether said data packet is correct or not by comparing said first value with said second value.

If the determining step determines that the data packet is incorrect; the method further comprises a step of discarding said data packet.

According to an embodiment of the invention, said data packet is associated with an unknown packet type indicated by said at least one bit.

Normally, a protocol, e.g. a standard, defines many different data packet types for communicating different kinds of information between two devices. For some reason, e.g. to create the possibility of defining some new message types in the future, in the previous version of the protocol some values of the bits used for indicating the type of the data packet are reserved for the future. How to define and use these reserved values is not known at the time of defining the previous version of the protocol; these reserved values probably will be defined (i.e. associated with a certain packet type) in the future version of the protocol, e.g. in the upgrade version. A newly defined packet which is sent by the new generation device, is considered a type-unknown packet when it is received by the old generation device.

In the context of this invention, if a device receiving a data packet knows what type this packet is, i.e. the header part is associated with a known packet type, this data packet is referred to as "type-known packet"; and if a device receiving a data packet does not know what type this packet is, i.e. the header part of this packet is associated with an unknown type according to the knowledge of this device, this data packet is referred to as a "type-unknown packet". For example, the header part for indicating the type information is one byte, of which the range from 0 to 180 is defined, and the range from 181 to 256 is reserved for future use: a data packet which has a header byte with a value between 181 and 256 is called a type-unknown packet.

A type-unknown packet may be received for example if a device which sends the packet is a new generation device in which some new packet types are defined, however the device which receives the packet is an old generation device in which these new types defined in the new generation are undefined/reserved in the old generation.

Normally, when the old generation device receives a type-unknown packet, it will discard this packet immediately since nobody has realized that there is a need to know further information of a type-unknown packet. However, the inventor of this invention found that it would be useful to obtain the size information of such a type-unknown packet.

Therefore, according to an embodiment of the invention, a method is disclosed of obtaining size information of a data packet of unknown type. With the size information of such a type-unknown packet, some useful steps can be implemented by the device receiving this type-unknown packet.

According to an embodiment of this invention, the first device corresponds to a transmitter, the second device corresponds to a receiver, the transmitter transmits power to the receiver inductively; and the receiver sends the data packet by modulating the power drawn from said transmitter. If the data packet is associated with an unknown packet type according to the at least one bit, and if the determining step determines that the data packet is incorrect; the method further comprises a step of aborting the transmission of power to the receiver.

From a fourth aspect of this invention, a first device is proposed for processing a data packet received from a second device. The data packet comprises a header part and a message part. The header part comprises at least one bit for indicating the type of said data packet. The first device comprises a first unit for obtaining the size of said data packet, based on said at least one bit.

According to an embodiment of this invention, the first device further comprises a second unit for identifying said message part from said data packet according to the obtained size information.

According to an embodiment of this invention, wherein said data packet further comprises a checksum part indicating a first value, the first device further comprises a third unit for calculating a second value, using said identified message part, and a fourth unit for determining whether said data packet is correct or not by comparing said second value with said first value. The second unit calculates the second value according to an exclusive-or algorithm.

According to an embodiment of this invention, the first device further comprises a fifth unit for discarding the data packet when it is determined that the data packet is incorrect.

According to an embodiment of this invention, wherein the first device corresponds to a transmitter, and the second device corresponds to a receiver, the transmitter transmits power to the receiver inductively; the receiver sends a data packet by modulating the power drawn from said transmitter; and the data packet is associated with an unknown packet type according to said at least one bit. The first device further comprises a sixth unit for aborting the transmission of power when it is determined that the data packet is incorrect.

From a fifth aspect of this invention, a data packet is proposed. The data packet comprises a header part and a message part, the header part comprising at least one bit for indicating the type of said data packet, and at least one bit is also associated with size information of said data packet. The data packet may also comprise a checksum part for verifying whether the data packet is correct or not.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference Figures quoted below refer to the attached drawings.

The invention is explained in further detail, and by way of example, with reference to the accompanying drawings wherein.

Figure 1:
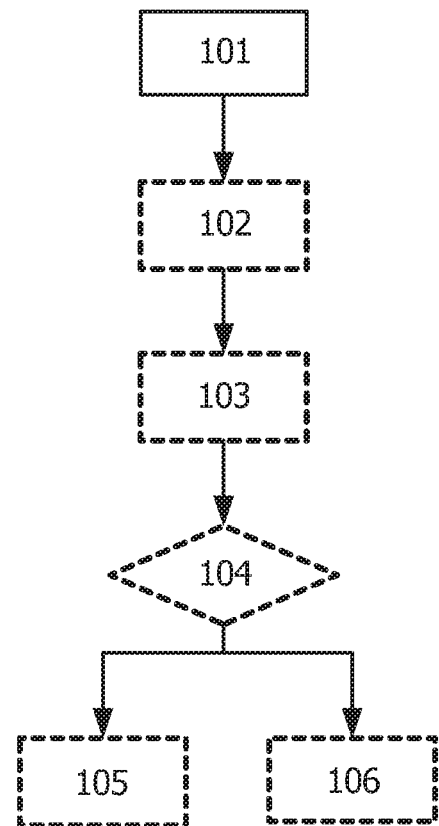
FIG. 1 shows a flowchart according to an embodiment of this invention.

The dotted lines in the Figures indicate related steps or blocks that are optional; in some embodiments, these can be omitted.

Throughout the above drawings, like reference numerals will be understood to refer to like, similar or corresponding features or functions.

From the first aspect of the invention, a data packet comprising a header part and a message part is proposed. The header part comprises at least one bit for indicating the type of said data packet, and the at least one bit is also associated with the size information of the data packet.

In such a way, the size information of a data packet can be encoded into the limited size of header part of said data packet and obtained by the device receiving that data packet. There are no additional dedicated bits for indicating the size information of the data packet.

An encoder for encoding such a data packet is proposed. The encoder could be implemented by means of hardware or software, or both. For example it can be implemented by a memory stored with instruction code or by a processor or a chip, etc.

A device comprising the aforementioned encoder is proposed, the device comprising a unit for sending the data packet to another device.

The association between the size information and the header part can be implemented by introducing a look-up table stored in the device receiving the data packet. The look-up table lists the bits that are used for indicating the type of data packet and the size information of this data packet-type.

As indicated above, in many cases, since the message part is the only part whose size may be different depending on the type, the size of the message part (also referred to as "length of the message part") is the only size information that needs to be encoded.

A concept of size classes can be used to indicate the size information, with a size class being a range of packet types which all have the same size. For example, size class 1 means that the message part consists of one byte, and size class 7 means that the message part consists of 7 bytes. Assuming the header part has one byte, this provides for up to 256 size classes, where each size class can have 1 ... 256 packets (with the constraint that the total number of packets does not exceed 256).

Table 1 shows an example of this implementation. It is to be noted that only column 1 and column 2 of table 1 are needed for implementing this invention. Column 3 is not necessary for the step of association size information to the header part; it is used just for the purpose of illustrating the concept of the invention.

As shown in table 1, the header parts from 0x00 to 0x0F reflect a message length of size class 1, which means that the packet type represented by any header part with a value from 0x00 to 0x0F has a message part that consists of 1 byte. In this way, a device receiving a data packet can obtain the size information of the data packet from table 1.

From table 1, it can be seen that both the defined type and the reserved type have been associated with size information. Therefore, a device receiving a type-unknown packet also can obtain the size information of such a type-unknown packet; and if a new packet type with a 7-byte message part needs to be defined in an upgrade (future) version of a protocol, one can select any of the reserved packet types from the group of size class 7, i.e. the header part of the selected packet type having a 7-byte message part should be in the range of values between 0x52 and 0x57. As a result, although an old version device does not know the newly defined packet type according to the old version look-up table, the old version device can get the size information of this unknown (undefined) packet. For example, for header byte 0x1F, although table 1 shows that it is a "reserved" packet type, the size of its message part can be obtained, which is 2.

This ensures forward compatibility with future releases without changes to the existing packet size and structure.

TABLE 1

| Column 1 Header byte | Column 2 Size class | Column 3 Packet type |
|---|---|---|
| 0x00 | 1 | Reserved |
| 0x01 | 1 | Signal Strength |
| 0x02 | 1 | End Power Transfer |
| ... | | |
| 0x05 | 1 | Charge Status |
| 0x06 | 1 | Reserved |
| ... | 1 | Reserved |
| 0x0F | 1 | Reserved |
| 0x10 | 2 | Reserved |
| ... | 2 | Reserved |
| 0x1F | 2 | Reserved |
| ... | | |
| 0x50 | | Reserved |
| 0x51 | 7 | Identification |
| 0x52 | 7 | Reserved |
| ... | 7 | Reserved |
| 0x57 | 7 | Reserved |
| ... | | |
| 0xFC | 31 | Reserved |
| 0xFD | 31 | Reserved |
| 0xFE | 32 | Reserved |
| 0xFF | 32 | Reserved |

Since it will require substantial space to store the table that associates size information of the data packet with the header part (such as table 1), in an advantageous implementation, the size information can be calculated from the header part using a simple formula, i.e. associating the size information with the header part via a formula, e.g. the formula is: header/8+1, where the division is an integer division (i.e. discarding any non-zero remainder; which means for a header with one byte for indicating the type of the data packet, the header having 256 different values representing 256 types, that this formula provides for 32 size classes having 8 possible packet types each. For example, if the header is: 0x52, the size information should be: 0x52/8+1=11, which means for example the message part is 11 bytes.

The formula can be different, based on how many size classes are needed and how many packet types are needed for each size class.

Without losing universality, in the following, the device receiving the data packet is referred to as a first device, and the device for sending the data packet is referred to as a second device. The first device and the second device could be any devices as long as the second device can send data to the first device and the first device can receive the data and interpret the data so as to perform the predefined action according to the received data. The methods and the first device for processing data packets are illustrated in detail hereinafter by way of example without limiting the protective scope of this invention.

FIG. 1 shows a flow chart of a method of processing a data packet by a first device according to an embodiment of this invention.

Figure 2:
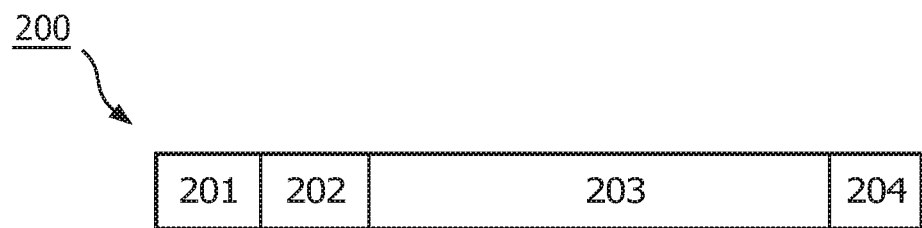
FIG. 2 depicts an example of the structure of data packet 200.

FIG. 2 shows an example of the structure of the data packet 200. The data packet 200 consists of four parts, namely, preamble part 201, header part 202, message part 203 and checksum part 204. The pre-amble part 201 signals the start of a data packet. The header part 202 indicates the type and size of the data packet. The message part 203 carries the message that the second device intends to transmit to the first device. The checksum part 204 is intended to be used to verify whether the data packet 200 is correct or not by means of the first device.

The first part that follows after the preamble 201 is the header part 202. The header part 202 is used to indicate the type of the data packet 200; in the scenario of this invention, the header part is assumed to be small; it has for example only 8 bits (1 byte).

The header part 202 is followed by the message part 203. The message part 203 has multiple bits for carrying the message. As indicated above, for different types of data packet, the size of the message part may be different. Some packet types may only need 1 byte as message part, while other packet types may need much more than 1 byte for carrying a message.

Figure 3:
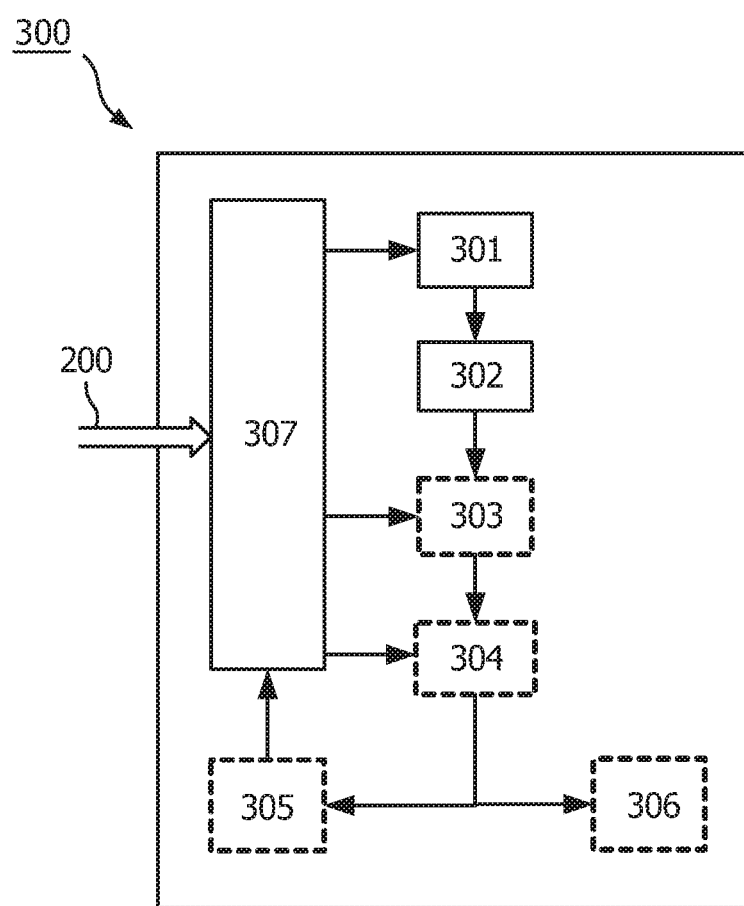
FIG. 3 illustrates a block diagram of the first device 300.

FIG. 3 schematically illustrates a block diagram of a first device 300.

Now, referring to FIGS. 1~3, the first device 300 comprises a memory 307 for storing the data packet 200 which is received from a second device. The received data packet 200 comprises a header part 202 and a message part 203. The header part 202 comprises at least one bit for indicating the type of said data packet, e.g. the header part 202 has 1 byte ($b_0, b_1, \ldots, b_7$) for indicating the type of the data packet 200. The first device 300 comprises a first unit 301 for performing a step 101 of obtaining the size information of said data packet 200 based on $b_0$~$b_7$.

Optionally, the obtaining step 101 can be performed by checking a look-up table associating $b_0$~$b_7$ with the size information of the packet 200. The look-up table should be pre-stored in the first device 300. An example of such a look-up table is column 1 and column 2 of table 1. For example, according to table 1, for the value of 0xFC, the size of the message part is in class 31, which means for example the message part has 31 bytes.

Advantageously, the obtaining step 101 can be performed by calculating the size of the packet, based on the value of the header part 202 according to a predefined formula pre-stored in the first device 300.

Table 2 shows an example of the pre-stored formulas for calculating the size of the packet (size of the message part) according to the value of the header part 202.

TABLE 2

| Header | Message Size |
|---|---|
| 0x00~0x1F | 1 + (header-0)/32 |
| 0x20~0x7F | 2 + (header-32)/16 |
| 0x80~0xDF | 8 + (header-128)/8 |
| 0xE0~0xFF | 20 + (header-224)/4 |

As shown in table 2, for header part values from 0x20 to 0x7F, the formula for calculating the size of the message part is (2+(header-32)/16). For example, if the header part 202 is 0x52, the size of the message part of packet 200 should be: 2+(0x52−32)/16=2+(82−32)/16=5, which means that the size of the message part of packet 200 is 5 bytes (40 bits).

Knowing the size information of the data packet 200, it helps to identify (locate) the different parts of the packet.

Advantageously, the first device 300 may comprise a second unit 302 for performing a step 102 of identifying said message part from said data packet according to the obtained size information. As a result, which bits belong to the message part 203 and which bits belong to the checksum part can be determined. In other words, the message part can be located.

When the different parts of the data packet are located, the first device 300 is then able to further perform some actions. For example, knowing which bits belong to the checksum byte, the first device then is able to verify the correctness of the received data packet 200.

Advantageously, the first device 300 comprises a third unit 303 for performing a step 103 of calculating a second value according to the identified message part; a fourth unit 304 for performing a step 104 of determining whether said data packet is correct or not by comparing a first value indicated by the checksum part 204 with the calculated second value.

The checksum part has a fixed-size datum computed from an arbitrary block of digital data for the purpose of detecting accidental errors that may have been introduced during its transmission or storage. The integrity of the data packet can be checked at any later time by re-computing the checksum value and comparing it with the stored one. If the checksums do not match, the data was almost certainly altered (either intentionally or unintentionally). The procedure that yields the checksum from the data is called a checksum function or checksum algorithm. A good checksum algorithm will yield a different result with high probability when the data is accidentally corrupted; if the checksums match, the data is very likely to be free of accidental errors.

The checksum part 204 comprises for example a single byte indicating a first value for verifying whether the data packet 200 is correct or not, i.e to verify whether the data packet 200 has been received correctly or not after the packet 200 is received by the first device from the second device.

To determine whether the packet 200 is correct, firstly, the first device has to retrieve the first value from the checksum part 204. Since the checksum part 204 follows the message part 203, the checksum byte 204 can be located when the message part 203 is located.

The first value represented by the checksum byte 204 is calculated according to a predefined algorithm by the second device and is added to the packet 200 as the checksum byte before the packet 200 is sent to the first device 300. If the first device 300 calculates the second value according to the same predefined algorithm, the second value should be the same as the first value. If the two checksum values are the same, the packet 200 has been transmitted correctly, i.e the packet 200 is correct; however, if they are not the same, there has been a transmission error during the transmission of the packet.

There are many algorithms for calculating the first and second value, for example, the longitudinal parity check, which breaks the data into "words" with a fixed number n of bits, and then computes the exclusive-or (referred to as XOR) of all those words. The result is appended to the packet as an extra word. To check the integrity of a message, the first device computes the exclusive-or of all its words (header byte, message part, and checksum byte); if the result is not a word with n zeros, the first device knows that a transmission error occurred.

As an example, the algorithm is: header byte XOR 1st message byte XOR 2nd message byte XOR . . . XOR last message byte. Consider for example the byte sequence 0x23 0x10 0x35 0x06 0x45. The packet starts at the first byte of the sequence, i.e. the header byte is 0x23. This means that the size of the message in the packet is 2 bytes according to table 2, i.e. 0x10 0x35. The byte following the message is the checksum, i.e. 0x06, which is calculated as 0x23 XOR 0x10 XOR 0x35. The last byte in the sequence (i.e. 0x45) is not actually part of the packet (and would be ignored by a transmitter).

Alternatively, any other known checksum algorithms could be used.

Advantageously, the first device further comprises a fifth unit 305 for performing a step 105 of discarding said data packet 200 when the fourth unit 304 determines that the data packet 200 is incorrect.

Since the packet 200 has been verified to be incorrect, the transmitter has to discard the data packet and wait for the next data packet, irrespective of whether the received data packet is a type-known packet or a type-unknown packet.

If the header part 202 corresponds to a type-unknown packet, it means the first device 300 does not know which type the data packet 200 is, and therefore the first device 300 cannot make use of this data packet. In this case, the first device has to discard the received data packet 200 no matter whether the packet is correct or incorrect so as to ensure that a first generation of e.g. transmitter would remain compatible with future generations of receivers.

Advantageously, the first device 300 corresponds to a transmitter, the second device corresponds to a receiver. The transmitter comprises one or more primary coils which are coupled with one or more secondary coils of the receiver. The primary coil is applied to an AC power source to generate a magnetic field which will induce a voltage in the secondary coils; in such a way, the transmitter can transmit power to the receiver. When the transmitter applies power to the receiver, the receiver can send data packet 300 by modulating the power drawn from said transmitter, i.e. by varying the power consumed from said transmitter. The first device 300 further comprises a sixth unit 306 for performing a step 106 of aborting the transmission of power when the fourth unit 304 determines that the data packet is incorrect. If the data packet 200 is sent in this way, the incorrectness of the data packet 200 indicates a power transmission problem since the data packet is modulated onto the power signal.

There are numerous ways of implementing functions by means of items of hardware or software, or both. In this respect, the drawings are also very illustrative, each representing only one possible embodiment of the invention. For example, the above-mentioned unit 301, 302, 303, 304, 305, 306 can be implemented by one or a plurality of memories stored with different instruction codes. These units may also be implemented by one or a plurality of printed circuit boards or by one or a plurality of processors.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed:

1. A method of processing a data packet, the method comprising:
    determining size information of a message part of the data packet,
    wherein the size information is determined according to the following mathematical relationship:

$$S=(Y+(X-Z)/Q),$$

wherein S is the size of the data packet, X is a value of a header part of the data packet, Y is an integer value, Z is an integer value, and Q is an integer value, and
    wherein the header part comprises at least one bit, the at least one bit indicating a type of the data packet, and
    wherein Q has a value that is greater than or equal to 4, Y has a value that is greater than or equal to 1, and Z has a value that is greater than or equal to 0.

2. The method of claim 1, further comprising:
    identifying the message part from the data packet according to the obtained size information.

3. The method of claim 2, wherein the data packet further comprises a checksum part indicating a first value,
    the method further comprising:
        calculating a second value according to the identified message part; and
        determining whether the data packet is correct or not by comparing the second value with the first value.

4. The method of claim 3, wherein the calculating includes calculating the second value according to an exclusive-or algorithm.

5. The method of claim 3, further comprising discarding the data packet when the data packet is determined to be incorrect.

6. The method of claim 1, wherein the data packet is associated with an unknown packet type according to the at least one bit.

7. The method of claim 3, further comprising:
    transmitting power inductively to a device;
    receiving the data packet from the device,
    wherein the data packet is associated with an unknown packet type according to the at least one bit,
    wherein the data packet is received from the device by a modulating of the power drawn from a transmitter,
    wherein the transmitter transmits the power inductively to the device; and
    aborting the transmitting of power to the device if the data packet is determined as incorrect.

8. A non-transitory computer-readable medium having one or more executable instructions stored thereon, which when the instructions are executed by a processor, cause the processor to perform the method of claim 1.

9. The method of claim 1, wherein Y is an integer in the range of 1 to 20, Z is an integer in the range of 0 to 224, and Q is an integer in the range of 4-32.

10. The method of claim 1, wherein Y, Z, and Q have different values for corresponding different ranges of the value of X.

11. A wireless power transfer device for processing a data packet, the wireless power transfer device comprising:
    wireless power circuitry; and
    processor circuitry configured to determine size information of a message part of the data packet according to the following mathematical relationship:

$$S=(Y+(X-Z)/Q),$$

wherein S is the size of the data packet, X is a value of a header part of the data packet, Y is an integer value, Z is an integer value, and Q is an integer value, and
    wherein the header part comprises at least one bit, the at least one bit indicating a type of the data packet, and
    wherein Q has a value that is greater than or equal to 4, Y has a value that is greater than or equal to 1, and Z has a value that is greater than or equal to 0.

12. The wireless power transfer device of claim 11, wherein the processor circuitry is further configured to identify the message part from the data packet according to the obtained size information.

13. The wireless power transfer device of claim 12, wherein the data packet further comprises a checksum part indicating a first value,
    the processor circuitry is further configured to:
        calculate a second value according to the identified message part; and
        determine whether the data packet is correct or not by comparing the second value with the first value.

14. The wireless power transfer device of claim 13, wherein the processor circuitry is further configured to discard the data packet if the processor circuitry determines that the data packet is incorrect.

15. The wireless power transfer device of claim 14,
    wherein the data packet is received from a receiver and is associated with an unknown packet type according to the at least one bit,
    wherein the wireless power circuitry is configured to inductively transmits wireless power to the receiver,
    wherein the receiver sends the data packet by modulating the power drawn from the transmitter, and
    wherein the processor circuitry is configured to abort the transmission of power to the receiver if the processor circuitry determines that the data packet is incorrect.

16. The wireless power transfer device of claim 11, wherein Y is an integer in the range of 1 to 20, Z is an integer in the range of 0 to 224, and Q is an integer in the range of 4-32.

17. The wireless power transfer device of claim 11, wherein Y, Z, and Q have different values for corresponding different ranges of the value of X.

18. An encoder for encoding a data packet, the encoder comprising:
   circuitry configured to assemble the data packet, the data packet comprising a header part and a message part, the header part comprising at least one bit,
   wherein the at least one bit indicates a type of the data packet,
   wherein the at least one bit is associated with size information of the message part of the data packet such that the size information can be determined according to the following mathematical relationship:

$$S=(Y+(X-Z)/Q),$$

wherein S is the size of the data packet, X is a value of a header part of the data packet, Y is an integer value, Z is an integer value, and Q is an integer value, and wherein Q has a value that is greater than or equal to 4, Y has a value that is greater than or equal to 1, and Z has a value that is greater than or equal to 0.

19. The encoder of claim 18 comprised in a device configured to receive inductively transmitted power, wherein the device is configured to transmit the data packet by modulating inductive power.

20. A method of claim 1, wherein the processing of the data packet includes processing a data packet in an inductive wireless power transmission system.

21. The encoder of claim 18, wherein Y is an integer in the range of 1 to 20, Z is an integer in the range of 0 to 224, and Q is an integer in the range of 4-32.

22. The encoder of claim 18, wherein Y, Z, and Q have different values for corresponding different ranges of the value of X.

* * * * *